Figures 1, 2:
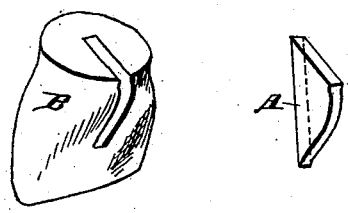

(No Model.)

J. S. CAMPBELL.
ARTIFICIAL TOOTH.

No. 465,460. Patented Dec. 22, 1891.

WITNESSES:

INVENTOR.
J. S. Campbell.
BY
Hopkins & Atkins
ATTORNEY,S

UNITED STATES PATENT OFFICE.

JOHN S. CAMPBELL, OF LONDON, ENGLAND.

ARTIFICIAL TOOTH.

SPECIFICATION forming part of Letters Patent No. 465,460, dated December 22, 1891.

Application filed June 9, 1890. Renewed October 27, 1891. Serial No. 409,977. (No model.)

*To all whom it may concern:*

Be it known that I, JOHN S. CAMPBELL, of London, county of Middlesex, England, have invented a certain new and useful Improvement in Artificial Teeth, of which the following is a specification, reference being had to the accompanying drawings.

The object of my invention is to improve a porcelain tooth, so that it will better serve the purpose of constructing that style of work called by the dental profession "metallic-plate work with soldered backings." I propose to construct this tooth with the view of saving the dentists the time usually taken to back-plate teeth; and I also propose to make stronger work than usual and work that may readily be kept clean by the wearer.

In the drawings, Figure 1 is a perspective view of a tooth made in accordance with my invention. Fig. 2 is a perspective view of a piece of hard platinum plate adapted to fill a slot in the lingual side of the tooth, as shown in Fig. 1.

The metal plate A is molded or pressed into the tooth B, and then baked in so as to be firmly held in place. The plate should be roughened upon its sides so as to engage with the tooth structure to prevent its coming out.

This tooth will require no fitting of a backing, as in ordinary plate-teeth, and has the advantage of presenting the platinum edgewise to receive the strain incident to use of the tooth in mastication. It also has the advantage of cleanliness and of leaving the natural contour of the teeth upon the lingual side. This tooth is, however, only adapted to plate-work and to bridge and crown work.

What I claim is—

A porcelain tooth having a vertical slot in the lingual side filled with a thin platinum plate baked in the slot flush with the lingual side of the tooth, substantially as set forth.

In testimony of all which I have hereunto subscribed my name.

JOHN S. CAMPBELL.

Witnesses:
S. G. HOPKINS,
LOUIS G. JULIHN.